Dec. 10, 1946.  H. BIEG  2,412,489
SPOT GAUGE
Filed May 5, 1944
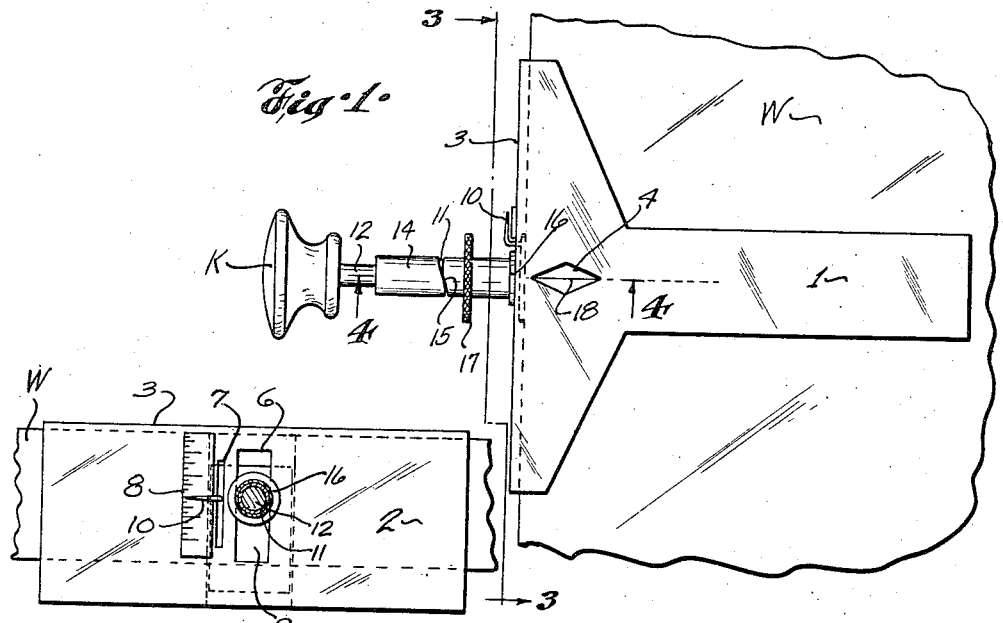
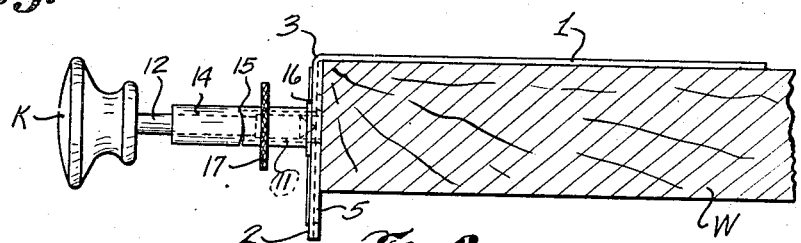
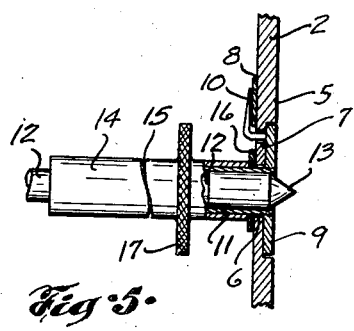
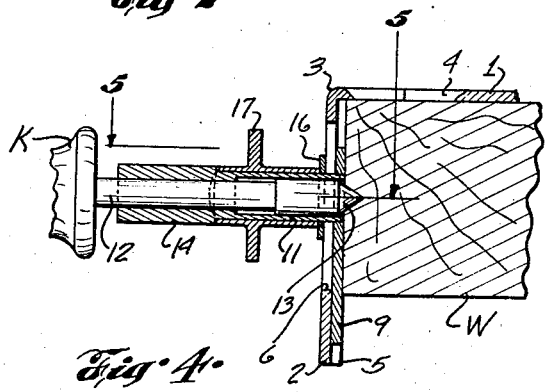
INVENTOR.
HERMAN BIEG
BY
J. F. Cook
ATTORNEY Patented Dec. 10, 1946

2,412,489

UNITED STATES PATENT OFFICE 2,412,489

SPOT GAUGE

Herman Bieg, St. Louis, Mo.

Application May 5, 1944, Serial No. 534,191

1 Claim. (Cl. 33—189)

This invention relates to spot gauges, its principal object being to produce such a gauge that will enable the operator to spot material for doweling or other purposes with absolute accuracy. While there are a number of spot gauges in use, none, so far as I am aware, is absolutely reliable. For instance, in spotting wood for doweling it sometimes happens that the point of the gauge will strike a knot in the wood, or perhaps will strike just at the edge of a knot, and in this event the point will be slightly deflected and the accuracy of the spotting will be impaired. My gauge overcomes this hazard entirely.

Another object of my gauge is that it offers sufficient surface for contact with the surface to be spotted to enable the operator to hold it firmly in place against accidental tilting or slippage, which further increases the accuracy of the spotting. Another important feature of my device is that its construction permits far greater speed in spotting than is possible with the gauges heretofore in use.

For the sake of simplicity I will describe my gauge in this specification as used in spotting wood for doweling, but it is to be understood that it could be used with equal success in marking other materials, or for other purposes than doweling, without departing from the spirit of the invention.

Fig. 1 is a plan view of my gauge as it appears when in place on a piece of wood that is to be spotted.

Fig. 2 is a side elevation of my gauge in place for the spotting operation.

Fig. 3 is a front view taken on line 3—3, Fig. 1, illustrating particularly the vertical spotting scale.

Fig. 4 is an enlarged sectional view taken on line 4—4, Fig. 1.

Fig. 5 is an enlarged sectional view taken on line 5—5, Fig. 4.

My spot gauge comprises a horizontal member 1 and a vertical member 2, the members 1 and 2 preferably being formed integrally of a single piece of any suitable material which forms a right angle at 3. The member 1 is substantially T-shaped (Fig. 1), and near its bent edge 3 and at the center of the transverse arms of the T-shaped member 1 a diamond-shaped aperture 4 is provided for a purpose to be hereinafter set forth.

As has been said, the members 1 and 2 are at right angles to each other, so that the member 1 is adapted to lie upon the upper surface of a piece of wood to be spotted for doweling and the vertical member 2 is adapted to lie against the vertical side of said wood, and both members 1 and 2 are of such width as to offer substantial contact with the wood, so that they may be held firmly in place. A facing 5 is secured to the inner face of the member 2 which contacts the wood, and at its center portion a section of the facing 5 is cut away for a purpose which will be explained later. At the center of the member 2 a rectangular aperture 6 is provided, and slightly to one side of the aperture 6 a longitudinal slot 7 is cut into said member 2. A graduated scale 8 is vertically mounted upon the outer face of the member 2 slightly to one side of the slot 7 (Fig. 3).

In the cut-out portion of the facing 5 above referred to, a section 9 of similar material is mounted for sliding up and down movement, so that the section 9 is visible through the aperture 6 and through the slot 7, and an indicator 10 is mounted upon said slidable section 9 in such a manner that it projects through the slot 7, the indicator 10 being formed so that it extends over the scale 8, and it is obvious that as the section 9 moves up or down the indicator moves with it over the scale 8.

A forwardly extending tubular member 11 is mounted upon the section 9, and a plunger 12 extends through said tubular member 11 for forward and backward movement, the forward end of said plunger being provided with a knob K for easy manipulation, and at the opposite end of the plunger a sharp-pointed element 13 is rigidly secured thereto so that the sharp point 13 protrudes rearwardly through an aperture in the sliding section 9 when the plunger 12 is pushed all the way back. A sleeve 14 surrounds the tubular member 11, and the sleeve 14 is bisected by means of a curving cut as shown at 15. The forward portion of the sleeve 14 is rigidly secured to the tubular member 11, but the rearward portion of said sleeve is mounted for rotating movement about said tubular member. The sleeve 14 extends rearwardly to a point just short of the vertical member 2, and an apertured disk 16 is inserted between said member 2 and the sleeve so that the plunger may be pushed rearwardly through said disk, since the aperture in the disk 16 and the above-mentioned aperture in the sliding member 9 are in registration with each other. The purpose of the disk 16 is to offer more contact surface between the sleeve 14 and the vertical member 2, and it is not rigidly secured to either of the last-mentioned elements. An apertured disk 17 is rigidly mounted upon the rotatable portion of the sleeve 14, and this disk 17 is of such size that it may be conveniently grasped by the operator.

In use the procedure is as follows: A piece of wood W is to be spotted for doweling. First the operator spaces off, probably with lead pencil lines 18, the distances at which the dowel pins are to be inserted. He then lays the gauge upon the wood surface above the first of the lead pencil marks so that the pencil mark comes exactly at the acute angles of the diamond-shaped aperture 4 in the T-shaped member 1. The operator knows at what depth from the top of the wood he wishes to insert the dowel pins. It will be remembered that the indicator 10 is slidable up and down with the sliding member 9, and the operator now sets the indicator at exactly the required depth on the graduated scale 8 by moving up or down the knob K which is secured to the plunger 12, the up and down movement being transmitted to the sliding member 9 through the tubular member 11 which is rigidly secured to said sliding member, all of which is obvious from the description of these parts given above.

When the indicator has been set, the operator grasps the disk 17 and turns it either to the right or left, which movement is transmitted to the rotatable portion of the sleeve 14. It will be recalled that the sleeve 14 is bisected by a curving cut 15, and when the rotatable portion is turned a sufficient distance this curving cut provides a camming action which forces the rotatable portion of the sleeve 14 firmly against the disk 16, which in turn is forced firmly against the vertical member 2 and there held in gripping engagement, which prevents further up and down movement of the slidable face 9 and consequently of the indicator 10.

The sharp point 13 is so positioned as to be in exact alinement with the indicator 10, and it will be readily understood that now the point 13 is at exactly the same depth on the wood as the indicator shows. All the parts are now in the right position for marking, and the operator strikes a blow on the knob K, which drives the plunger 12 backward and forces the sharp point 13 into the wood, thus leaving a mark for boring a hole at exactly the place where it desired to insert a pin or provide a hole for the reception of a pin.

The camming action of the curved cut 15 holds the indicator securely in position, so all that the operator needs to do if he wants to mark the wood for a series of dowel pins is to move the gauge along from one pencil mark to the next, being careful each time to see that the pencil mark comes exactly at the acute angles of the aperture 4, and then strike a blow on the knob K, and all his marks will be in exact alinement, and it will be seen that this operation can be performed with great rapidity.

When this operation has been completed and it is desired to set the indicator at another depth, it is only necessary to release the camming action by turning the disk 17, when the above procedure can be repeated.

While I have shown the aperture 4 with its acute angles pointing to the front and rear of the device, it is obvious that it could be so placed that its obtuse angles occupied these positions, in which case the lead pencil line 18 would of course come at the obtuse angles.

I claim:

A spot gauge comprising a member provided with a sight opening and a second member forming a right angle with said first member, a slidable portion on the rear face of said second member, a measuring scale mounted on said second member, an indicator mounted on the slidable portion and movable therewith through a slot in the second member, a tubular member rigidly mounted on said slidable portion and movable therewith through an aperture in said second member, a housing for said tubular member, said housing being bisected by a curving cut and one section of said housing being rigidly secured to said tubular member while the other section is rotatable about said tubular member, so that said curving cut affords camming action when a section of said housing is rotated about said tubular member for retaining said slidable portion at a predetermined position, and an element terminating in a sharp point and adapted for forward and backward movement within said tubular member for making a mark on the article to be spotted at a point in alinement with said indicator.

HERMAN BIEG.